(12) United States Patent
Offer et al.

(10) Patent No.: US 7,076,017 B2
(45) Date of Patent: Jul. 11, 2006

(54) APPARATUS AND METHOD FOR REPAIRING REACTOR VESSEL CLADDING USING A SEAL PLATE

(75) Inventors: Henry Peter Offer, Los Gatos, CA (US); Frank Ortega, San Jose, CA (US); David Wesley Sandusky, Los Gatos, CA (US)

(73) Assignee: General Electric Company, Schenectady, NY (US)

( * ) Notice: Subject to any disclaimer, the term of this patent is extended or adjusted under 35 U.S.C. 154(b) by 564 days.

(21) Appl. No.: 10/641,801

(22) Filed: Aug. 15, 2003

(65) Prior Publication Data

US 2005/0069077 A1   Mar. 31, 2005

(51) Int. Cl.
*G21C 13/00* (2006.01)

(52) U.S. Cl. .................. 376/294; 29/402.9; 29/402.13; 29/402.16; 137/15.08; 137/15.11; 376/260

(58) Field of Classification Search .................. 376/294, 376/203; 29/402.09, 402.11, 402.13, 402.14, 29/402.15, 402.16; 137/15.01, 15.08, 15.11
See application file for complete search history.

(56) References Cited

U.S. PATENT DOCUMENTS

| | | | | |
|---|---|---|---|---|
| 4,176,437 A | * | 12/1979 | Scholz et al. | 29/402.12 |
| 4,524,729 A | * | 6/1985 | Hill, Jr. et al. | 376/203 |
| 5,654,992 A | * | 8/1997 | Uraki et al. | 29/402.15 |
| 5,714,735 A | | 2/1998 | Offer | |
| 5,770,273 A | | 6/1998 | Offer et al. | |
| 5,793,009 A | | 8/1998 | Offer | |
| 5,852,271 A | | 12/1998 | Offer | |
| 5,905,771 A | * | 5/1999 | Erbes et al. | 29/402.15 |
| 5,981,897 A | | 11/1999 | Offer et al. | |
| 6,255,616 B1 | | 7/2001 | Offer | |
| 6,345,927 B1 | | 2/2002 | Pao et al. | |
| 6,373,019 B1 | | 4/2002 | Offer et al. | |
| 6,417,476 B1 | | 7/2002 | Offer et al. | |

\* cited by examiner

*Primary Examiner*—Harvey E. Behrend
(74) *Attorney, Agent, or Firm*—Armstrong Teasdale LLP

(57) ABSTRACT

A seal plate for repairing damaged areas in a pressure vessel cladding includes a first side and an opposing second side and a sealing portion located on the second side, with the sealing portion circumscribing the seal plate. The seal plate also includes a seal lip extending from a periphery of the sealing portion and a cavity located in the second side, with the cavity circumscribed by the sealing portion. The seal plate further includes at least one purge port extending from the first side to the cavity. Each purge port is in fluid communication with the cavity.

18 Claims, 5 Drawing Sheets

APPARATUS AND METHOD FOR REPAIRING REACTOR VESSEL CLADDING USING A SEAL PLATE

BACKGROUND OF THE INVENTION

This invention relates generally to pressure vessels, and more particularly to repairing vessel cladding using a seal plate.

In a pressure vessel, for example a nuclear reactor pressure vessel, the reactor water environment is corrosive to unprotected reactor pressure vessel low-alloy steel. A stainless steel or nickel-base cladding normally forms a barrier to keep water from contacting the low-alloy steel. In cases where the cladding has been damaged causing a breach of the water sealing barrier, a repair must be considered, for example, by locally replacing or repairing the cladding in the defect area.

Direct welding repair of the welded cladding is typically performed using a temper bead welding technology, which permits welding on a hardenable material without the typical need for subsequent post-weld heat treatment to soften the underlying heat-affected zone (HAZ). Temper bead welding must be performed in a dry environment to provide sufficiently slow, controlled cooling rates as each weld pass is deposited. There is a risk of cracking the low-alloy steel during this operation, or later when returned to service, if the welding heat input is not properly controlled to result in a sufficiently soft HAZ microstructure to be able to withstand the inherently high tensile residual stresses of a welded repair on a heavy section, such as the vessel.

In addition to the cracking risks noted above, the specialized temper bead welding process requires precision placement of each bead to control its overlap on the adjacent, previously deposited bead in order to effect the correct degree of tempering without excessively softening or rehardening previously tempered portions of the HAZ. Such precision heat input control and bead placement is very difficult when the welding process is remotely applied, particularly when the access is severely limited as when servicing reactor vessel internal structures. In addition, the simple wet welding methods (where the arc is directly in the water) have not been developed for the application of existing temper bead technology. Further, application of any fusion welding techniques to low alloy steel in a damp or wet environment risks introduction of hydrogen-induced cracking.

BRIEF DESCRIPTION OF THE INVENTION

In one aspect, a seal plate for repairing damaged areas in a pressure vessel cladding is provided. The seal plate includes a first side and an opposing second side and a sealing portion located on the second side, with the sealing portion circumscribing the seal plate. The seal plate also includes a seal lip extending from a periphery of the sealing portion and a cavity located in the second side, with the cavity circumscribed by the sealing portion. The seal plate further includes at least one purge port extending from the first side to the cavity. Each purge port is in fluid communication with the cavity.

In another aspect, a nuclear reactor is provided. The reactor includes a reactor pressure vessel having an inner surface covered by a cladding, and a seal plate attached to the inner surface of the pressure vessel. The seal plate includes a first side and an opposing second side and a sealing portion located on the second side, with the sealing portion circumscribing the seal plate. The seal plate also includes a seal lip extending from a periphery of the sealing portion and a cavity located in the second side, with the cavity circumscribed by the sealing portion. The seal plate further includes at least one purge port extending from the first side to the cavity. Each purge port is in fluid communication with the cavity.

In another aspect, a method of repairing damaged areas in a pressure vessel cladding is provided. The method includes positioning a seal plate over a damaged area in the pressure vessel cladding. The seal plate including a first side and an opposing second side, a sealing portion located on the second side, and circumscribing the seal plate, a seal lip extending from a periphery of the sealing portion, a cavity located in the second side circumscribed by the sealing portion, and at least one purge port extending from the first side to the cavity, with each purge port in fluid communication with the cavity. The method also includes purging water from the seal plate cavity through the at least one purge port, and welding the seal plate in place.

DETAILED DESCRIPTION OF THE INVENTION

A seal plate for repairing damaged areas of the cladding deposited on pressure vessels is described below in more detail. The seal plate permits purging the damaged area to dry the area and permanently sealing the exposed low-alloy steel or other susceptible material in the damaged area against environmental degradation, including water-induced corrosion or stress corrosion cracking. The seal plate is made from stainless steel or other material sufficiently resistant to environmental degradation in the pressure vessel's service fluid, such as reactor cooling water. Also, the seal plate is custom machined, if needed, to closely fit the general contour of the pressure vessel surface cladding. The seal plate is described below in reference to a boiling water nuclear reactor, but can also be used in other types of nuclear reactors, for example, pressurized water reactors.

Figure 1:
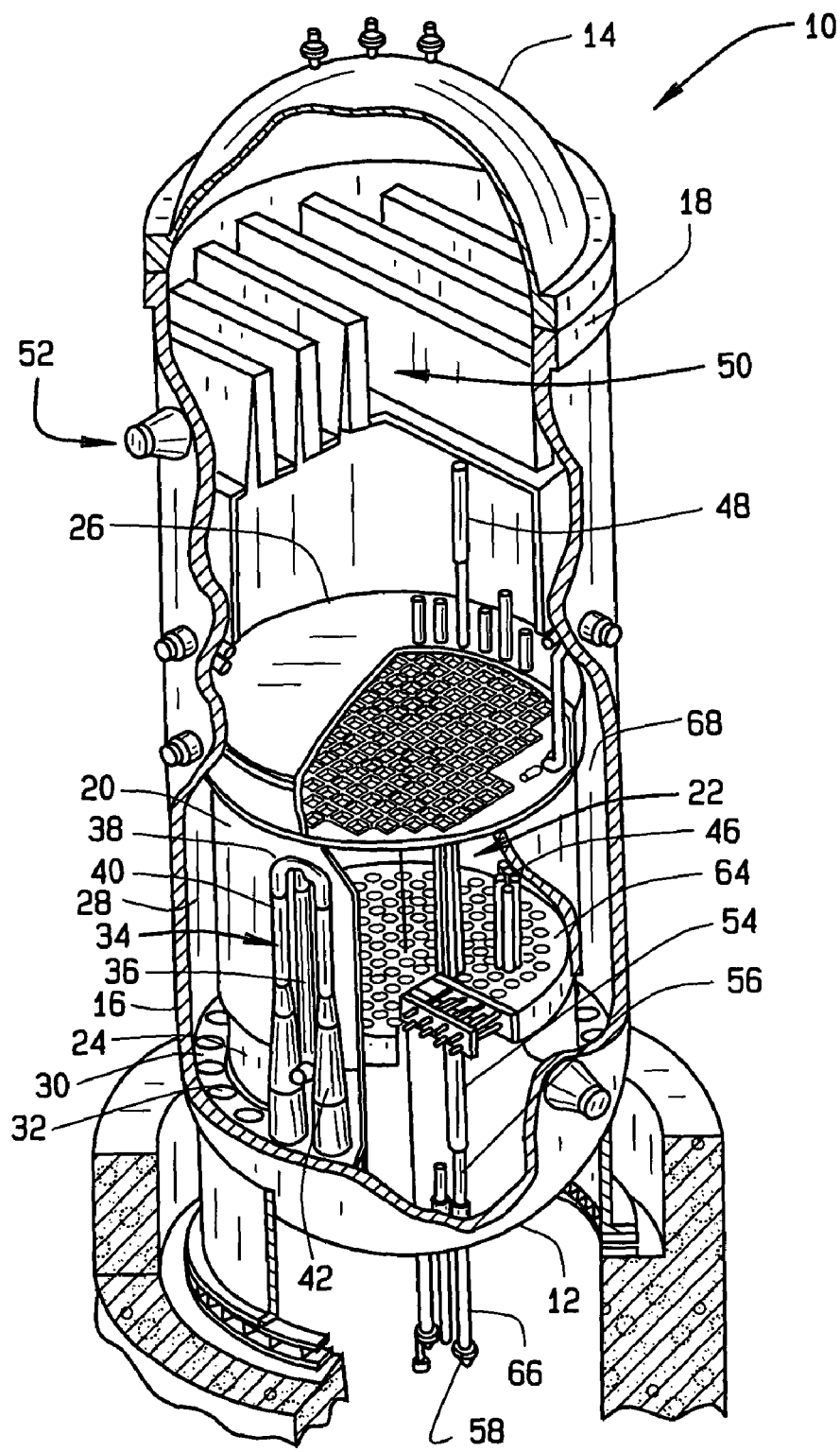
FIG. 1 is a sectional schematic view, with parts cut away, of a boiling water nuclear reactor pressure vessel.

Referring to the drawings, FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. Side wall 16 includes a top flange 18. Top head 14 is attached to top flange 18. A cylindrically shaped core shroud 20 surrounds a reactor core 22. Shroud 20 is supported at one end by a shroud support 24 and includes an opposed removable shroud head 26. An annulus 28 is formed between shroud 20 and side wall 16. A baffle plate 30, which has a ring shape, extends between shroud support 24 and RPV side wall 16. Baffle plate 30 includes a plurality of circular openings 32, with each opening housing a jet pump 34. Jet pumps 34 are circumferentially distributed around core shroud 20. An inlet riser pipe 36 is coupled to two jet pumps 34 by a transition assembly 38. Each jet pump 34 includes an inlet mixer 40, and a diffuser 42.

Heat is generated within core 22, which includes fuel bundles 46 of fissionable material. Water circulated up through core 22 is at least partially converted to steam. Steam separators 48 separates steam from water, which is recirculated. Steam dryers 50 remove residual water from the steam. The steam exits RPV 10 through a steam outlet 52 near vessel top head 14.

The amount of heat generated in core 22 is regulated by inserting and withdrawing a plurality of control rods 54 of neutron absorbing material, for example, hafnium. To the extent that control rod 54 is inserted into fuel bundle 46, it absorbs neutrons that would otherwise be available to promote the chain reaction which generates heat in core 22.

Control rod 54 couples with a control rod drive (CRD) 58 which moves control rod 54 relative to a core plate 64 and fuel bundles 46. CRD 58 extends through bottom head 12 and is enclosed in a control rod drive housing 66. A control rod guide tube 56 extends vertically from control rod drive mechanism housing 66 to core plate 64. Control rod guide tubes 56 restrict non-vertical motion of control rods 54 during control rod 54 insertion and withdrawal.

A corrosion resistant cladding 68 is deposited in the inner surface of RPV 10. Cladding 68 forms a barrier that prevents water from contacting the low-alloy steel used to form side wall 16, top head 14, and bottom head 12 of RPV 10. Cladding 68 can be any suitable material, for example, stainless steel cladding or nickel-base alloy cladding.

Figure 2:
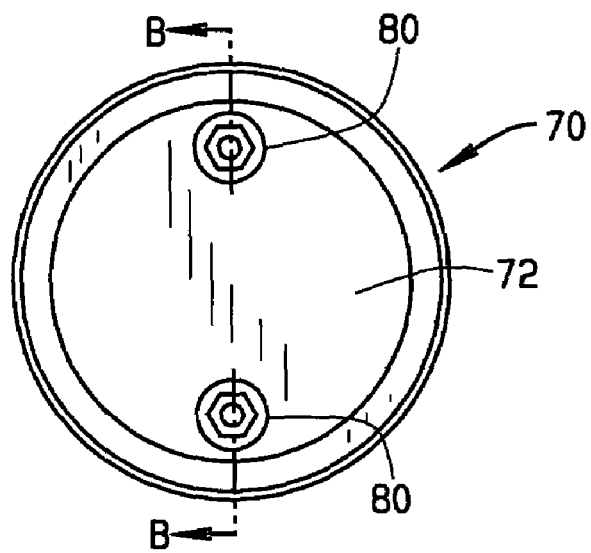
FIG. 2 is a top schematic view of a seal plate in accordance with an embodiment of the present invention.
Figure 3:
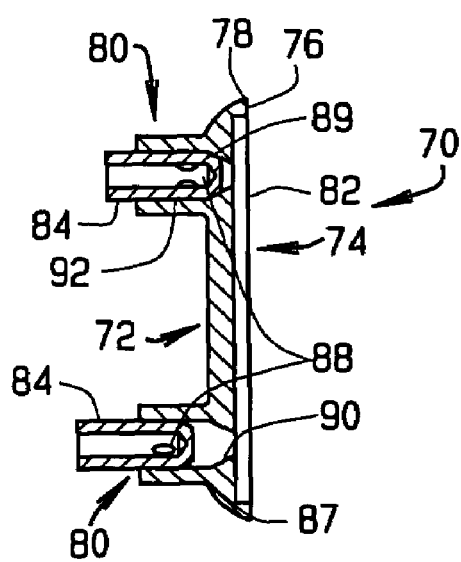
FIG. 3 is a schematic sectional view of the seal plate shown in FIG. 2.
Figure 4:
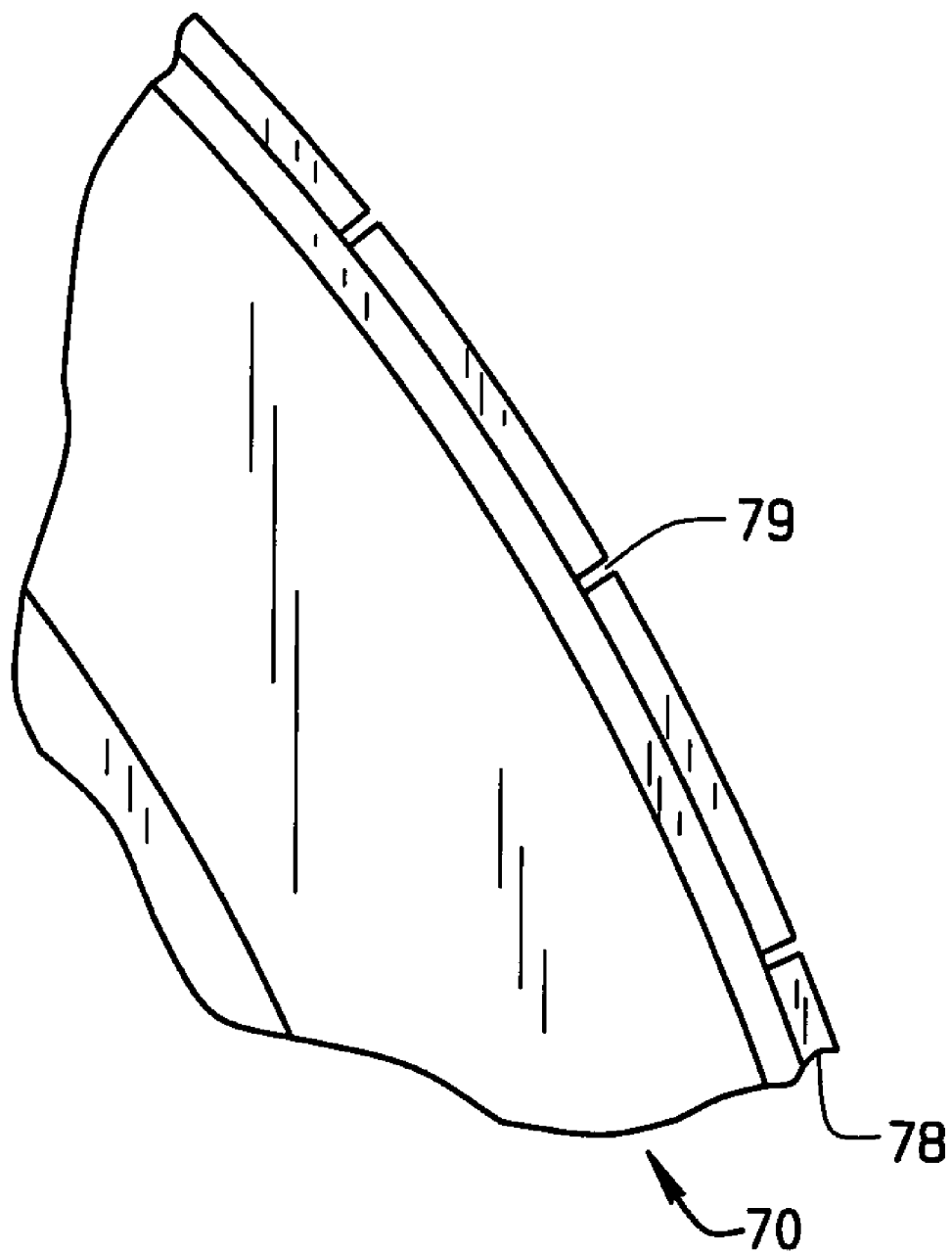
FIG. 4 is an enlarged schematic view of a portion of the seal plate shown in FIG. 2.

FIG. 2 is a top schematic view of a seal plate 70 in accordance with an embodiment of the present invention. FIG. 3 is a schematic sectional view of seal plate 70 and FIG. 4 is an enlarged schematic view of a portion of seal plate 70. Referring to FIGS. 2–4, in an exemplary embodiment, seal plate 70 includes a first side 72 and an opposing second side 74. A sealing portion 76 is located on second side 74 and circumscribes seal plate 70. A seal lip 78 extends from the periphery of sealing portion 76. Seal lip 78 is a deformable lip or compliant seal to accommodate reduction in maximum fit-up gap between second side 74 of seal plate 70 and the existing cladding surface to which it is applied. This reduction in gap also improves the ability to fully purge water from the backside of seal plate when it is welded in an underwater environment, as well as to provide an inert gas flow to displace moisture and prevent oxidation during welding of the critical root pass. Seal lip 78 in one embodiment is made of pre-placed and machined weld filler material, such as a "butter" layer, but in an alternate embodiment is integrally machined from the seal plate stock. A plurality of radial slits 79 in seal lip 78 permit localized spring action in seal lip 78 to conform seal lip 78 to an uneven surface.

Integrated into seal plate 70 first side 72 are at least one purge hole or port 80 (two shown) that are in fluid communication with a cavity 82 in second side 74 of seal plate 70. Cavity 82 is circumscribed by sealing portion 76. Purge ports 80 permit adjustable cross-flow during the attachment, for example, by welding, of seal plate 70 to pressure vessel 10. Purge ports 80 also permit pressure testing seal plate 70 after welding is completed. In the exemplary embodiment, purge ports 80 are vertically aligned after attachment of seal plate 70 to pressure vessel 10 to facilitate draining of trapped liquid and venting of moisture-laden gas from cavity 82. Purge ports 80 also are used to provide a flow of inert gas to the backside of the weld root to prevent excessive oxidation during welding. When draining cavity 82, the gas purge flow rate is relatively high to displace liquid drops adhering to the surface of the cladding or the defect. During welding of the root pass, the inert gas flow is relatively low; sufficient to prevent re-entry of surrounding water behind the seal plate 70 when applied in an underwater environment, but insufficient to displace or excessively chill the molten metal during application of the seal weld. Flexible sealing lip 78 around the perimeter of seal plate 70 insures that there is a sufficiently small and uniform gap for the purge gas to escape from cavity 82 evenly.

A plug 84 is located in each purge port 80. Plug 84 includes a flow channel 86 extending part way into plug 84. At least one flow port 88 provides flow communications between plug flow channel 86 and purge port 80 when plug 84 is in an open position 87. When plug 84 is in a closed position 89, flow ports 88 are not open to purge port 80 and there is no flow communication between plug flow channel 86 and purge port 80 thereby sealing purge port 80. In closed position 89, plug 84 mates with a plug sealing surface 90 inside purge port 80. A threaded joint 92 between plug 84 and purge port 80 permits plug 84 to move between open position 87 and closed position 89. After purge plate 70 has been welded in place and cavity 82 has been purged, plugs 84 are tightened to closed position 89 to permanently seal cavity 82. Plugs 84 are then tack welded, seal welded, pinned, or crimped in place to prevent possible loosening during service.

Figure 5:
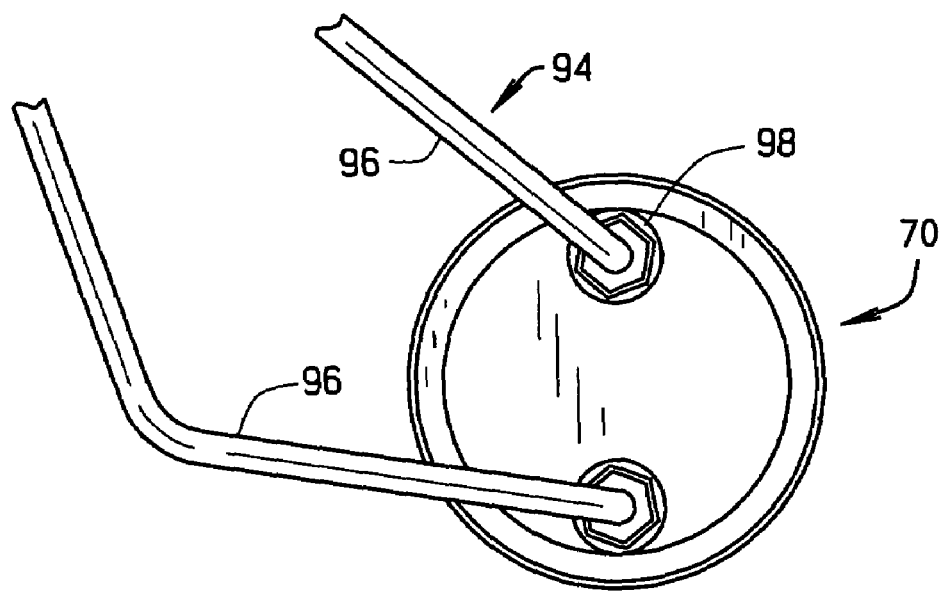
FIG. 5 is a top schematic view of the seal plate shown in FIG. 2 with purge hose assemblies attached.
Figure 6:
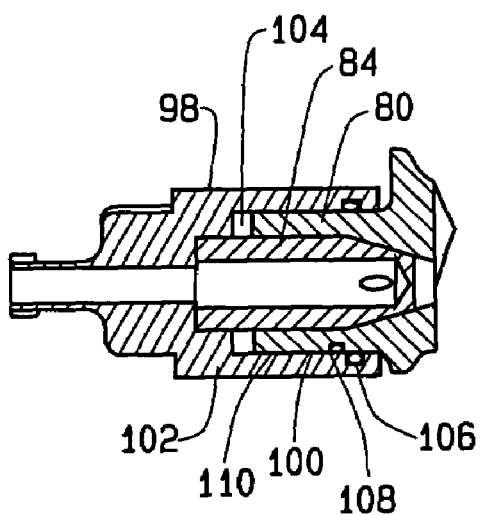
FIG. 6 is a schematic sectional view of the purge port and purge hose assembly shown in FIG. 6.

Referring also to FIGS. 5 and 6, a removable purge hose assembly 94 is attached to each purge port 80. Purge hose assembly 94 connects a purge port 80 to a supply of inert purge gas (not shown) or to a gas and liquid collection system (not shown). Purge hose assembly 94 includes a hose 96 connected to a purge seal connector member 98. Purge seal connector member 98 threadedly mates with the outer surface 100 of purge port 80. Purge seal member 98 includes an outer wall 102 that defines a sealing chamber 104 that is sized to receive purge port 80. A seal ring 106 is located in an inner surface 108 of outer wall 102 to prevent leakage through a threaded joint 110.

Figure 7:
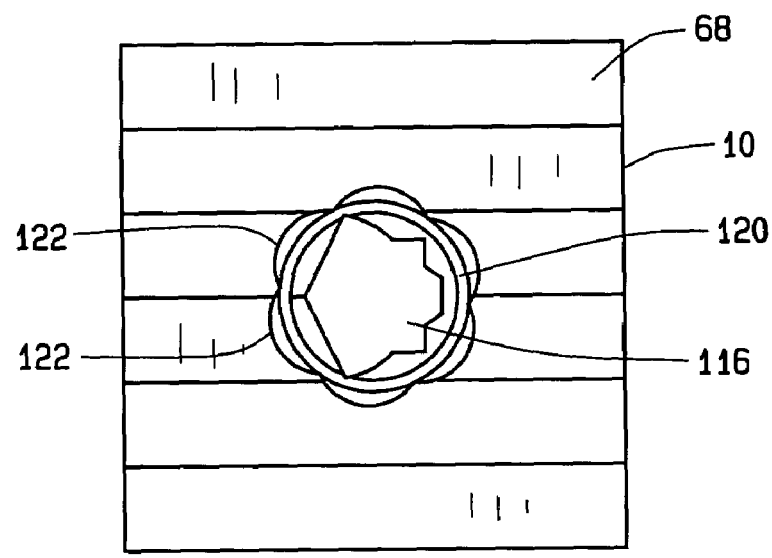
FIG. 7 is a schematic illustration of a defect in the cladding of a portion of the reactor pressure vessel shown in FIG. 1.

Referring also to FIG. 7, prior to installing seal plate 70 to repair a defect 116 in cladding 68 of pressure vessel 10, a smooth annular surface 120 is machined around defect 116 in cladding 68. Annular surface 120 is sized and positioned to mate with sealing portion 76 of seal plate 70 to facilitate welding seal lip 78 to pressure vessel 10. Also, chamfer areas 122 are machined in cladding 68 around annular surface 120 to facilitate welding. In embodiments where cladding 68 is smooth, annular surface 120 and/or chamfer areas 122 are not needed to obtain a seal between seal plate 70 and cladding 68.

Purge plate 70 is positioned in place over defect 116 with cavity 82 enclosing defect 116, purge ports 80 vertically aligned, and sealing portion seated on annular surface 120 machined cladding 118. Water is purged from cavity 82 through purge ports 80 and purge hose assemblies 96. An inert purge gas is introduced into cavity 82 through the upper purge port 80 and trapped liquid and moisture laden gas is removed through the lower purge port 80. Purge plate 70 is then tack welded in place and a first weld pass is performed. Purge plate 70 can then be leak tested by pressurizing purge ports 80. Final weld passes are then performed and a final pressure test is performed. Purge hose assemblies 96 are removed from purge ports 80 and plugs 84 are tightened to closed position 89 to permanently seal cavity 82. Plugs 84 are then tack welded, seal welded, pinned, or crimped in place to prevent possible loosening during service.

Purge ports 80 can also be used to introduce a welding flux to facilitate welding of the root pass if complete purging of the liquid in cavity 82 or weld root penetration becomes problematic. Also, purge ports 80 can be used for introduction of helium for the purpose of increased-sensitivity weld leak testing. Further, after completion of the weld root pass, purge ports 80 can be used to introduce a corrosion inhibitor or other additive to cavity 82.

Figure 8:
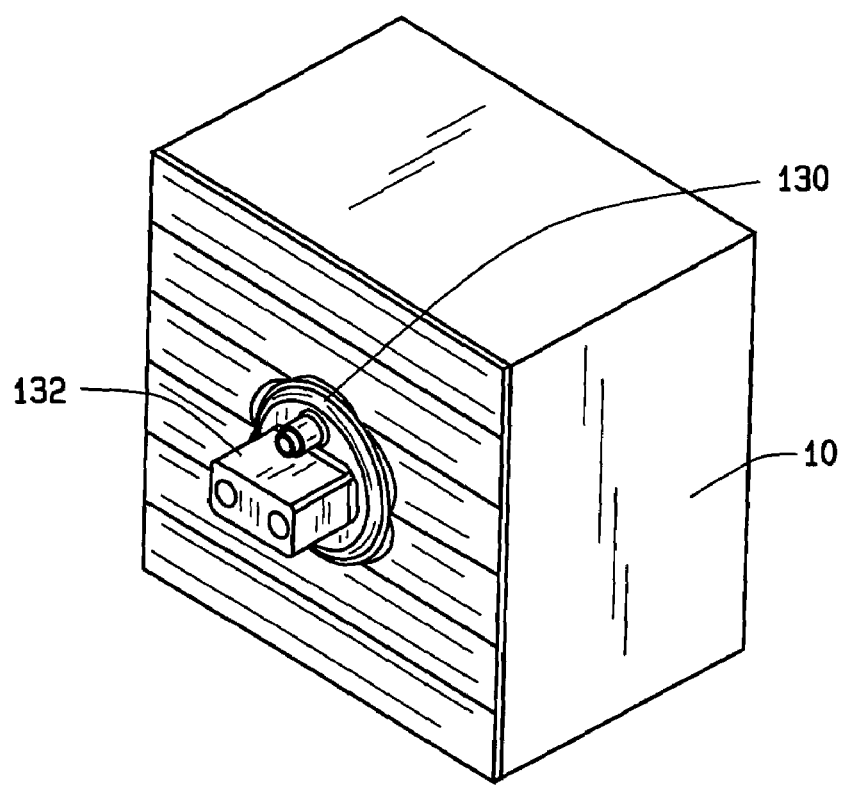
FIG. 8 is a perspective schematic view of a purge plate in accordance with another embodiment attached to a portion of the pressure vessel shown in FIG. 1.

FIG. 8 is a perspective schematic view of a purge plate 130 in accordance with another embodiment attached to a portion of pressure vessel 10. Purge plate 130 is similar to purge plate 70 described above, but also includes a structural boss or clevis 132 to which a secondary load-bearing member can be attached.

While the invention has been described in terms of various specific embodiments, those skilled in the art will recognize that the invention can be practiced with modification within the spirit and scope of the claims.

What is claimed is:

1. A seal plate for repairing damaged areas in a pressure vessel cladding, said seal plate comprising:
    a first side and an opposing second side;
    a sealing portion located on said second side, said sealing portion circumscribing said seal plate;
    a seal lip extending from a periphery of said sealing portion;
    a cavity located in said second side, said cavity circumscribed by said sealing portion; and
    at least one purge port extending from said first side to said cavity, each said purge port in fluid communication with said cavity.

2. A seal plate in accordance with claim 1 further comprising a plug positioned in each said purge port, each said plug sized to seal a corresponding purge port.

3. A seal plate in accordance with claim 1 further comprising a purge hose assembly connected to each said purge port.

4. A seal plate in accordance with claim 2 wherein each said plug comprises:
    a flow channel; and
    at least one flow port in fluid communication with said flow channel.

5. A seal plate in accordance with claim 4 wherein each said flow port is in fluid communication with said cavity when said corresponding plug is in an open position, and said flow port is not in fluid communication with said cavity when said corresponding plug is in a closed position.

6. A seal plate in accordance with claim 3 wherein said purge hose assembly comprises:
    a purge seal member sized to mate with said purge port; and
    a hose coupled to and in flow communication with said purge seal member.

7. A seal plate in accordance with claim 6 wherein said purge seal member comprises:
    an outer wall defining a sealing chamber therein, said sealing chamber sized to receive said purge seal port;
    a seal ring located in an inner surface of said outer wall of said purge seal member.

8. A seal plate in accordance with claim 1 wherein said seal lip comprises a plurality of radial slits.

9. A seal plate in accordance with claim 1 further comprising a structural boss extending from said first side.

10. A nuclear reactor comprising:
    a reactor pressure vessel comprising an inner surface covered by a cladding; and
    a seal plate attached to said inner surface of said pressure vessel, said seal plate comprising:
    a first side and an opposing second side;
    a sealing portion located on said second side, said sealing portion circumscribing said seal plate;
    a seal lip extending from a periphery of said sealing portion;
    a cavity located in said second side, said cavity circumscribed by said sealing portion; and
    at least one purge port extending from said first side to said cavity, each said purge port in fluid communication with said cavity.

11. A nuclear reactor in accordance with claim 10 wherein said seal plate further comprises a plug positioned in each said purge port, each said plug sized to seal a corresponding purge port.

12. A nuclear reactor in accordance with claim 10 wherein said seal plate further comprises a purge hose assembly connected to each said purge port.

13. A nuclear reactor in accordance with claim 11 wherein each said plug comprises:
    a flow channel; and
    at least one flow port in fluid communication with said flow channel.

14. A nuclear reactor in accordance with claim 13 wherein each said flow port is in fluid communication with said cavity when said corresponding plug is in an open position, and said flow port is not in fluid communication with said cavity when said corresponding plug is in a closed position.

15. A nuclear reactor in accordance with claim 12 wherein said purge hose assembly comprises:
    a purge seal member sized to mate with said purge port; and
    a hose coupled to and in flow communication with said purge seal member.

16. A nuclear reactor in accordance with claim 15 wherein said purge seal member comprises:
    an outer wall defining a sealing chamber therein, said sealing chamber sized to receive said purge seal port;
    a seal ring located in an inner surface of said outer wall of said purge seal member.

17. A nuclear reactor in accordance with claim 10 wherein said seal lip comprises a plurality of radial slits.

18. A nuclear reactor in accordance with claim 10 wherein said seal plate further comprises a structural boss extending from said first side.

* * * * *